United States Patent [19]

Wilkinson

[11] Patent Number: 4,620,969

[45] Date of Patent: Nov. 4, 1986

[54] ELECTROLYSIS OF ALKALI METAL CHLORIDE SOLUTION WITH SUBSEQUENT PRODUCTION OF ALKALI METAL CARBONATES AND HYPOCHLORITES

[75] Inventor: John S. Wilkinson, Huddersfield, England

[73] Assignee: Imperial Chemical Industries plc, London, England

[21] Appl. No.: 776,047

[22] Filed: Sep. 13, 1985

[30] Foreign Application Priority Data

Sep. 19, 1984 [GB] United Kingdom ............... 8423642

[51] Int. Cl.$^4$ .................. C01D 7/07; C01B 11/12; C25B 1/34; C25B 1/02
[52] U.S. Cl. .................................. 423/421; 204/98; 204/128; 204/87; 204/95; 204/101; 423/475
[58] Field of Search .................. 204/87, 95, 98, 101, 204/128; 423/421, 475

[56] References Cited

U.S. PATENT DOCUMENTS

| | | | |
|---|---|---|---|
| 2,287,061 | 6/1942 | Osborne et al. | 423/475 |
| 3,514,381 | 5/1970 | Seguela | 204/87 |
| 3,652,202 | 3/1972 | Stewart et al. | 204/87 |
| 3,745,101 | 7/1973 | Currey et al. | 204/128 |
| 3,878,072 | 4/1975 | Cook, Jr. et al. | 204/128 |
| 3,970,528 | 7/1976 | Zirngiebl et al. | 204/128 |
| 4,155,820 | 5/1979 | Ogawa et al. | 204/128 |
| 4,240,885 | 12/1980 | Suciu et al. | 204/98 |
| 4,242,185 | 12/1980 | McRae | 204/98 |
| 4,337,126 | 6/1982 | Gilligan, III et al. | 204/101 |
| 4,417,961 | 11/1983 | Ezzell et al. | 204/128 |

FOREIGN PATENT DOCUMENTS 719234 8/1954 United Kingdom ............... 423/475

Primary Examiner—John F. Niebling
Assistant Examiner—Terryence Chapman
Attorney, Agent, or Firm—Cushman, Darby & Cushman

[57] ABSTRACT

A process for the production of chlorine by the electrolysis of aqueous sodium chloride solution in which a gaseous stream containing chlorine and carbon dioxide is passed into a first reaction vessel and thence into a second reaction vessel and aqueous sodium hydroxide solution is charged to the first reaction vessel and aqueous sodium hydroxide solution is separately charged to the second reaction vessel, an aqueous solution containing sodium hypochlorite being removed from the first reaction vessel and an aqueous solution containing an alkali metal carbonate being removed from the second reaction vessel.

The process enables saleable alkali metal hypochlorite to be produced which may be substantially free of sodium carbonate, and also aqueous sodium carbonate solution which may be used to precipitate polyvalent metal salts in the purification of the aqueous sodium chloride solution.

10 Claims, 1 Drawing Figure

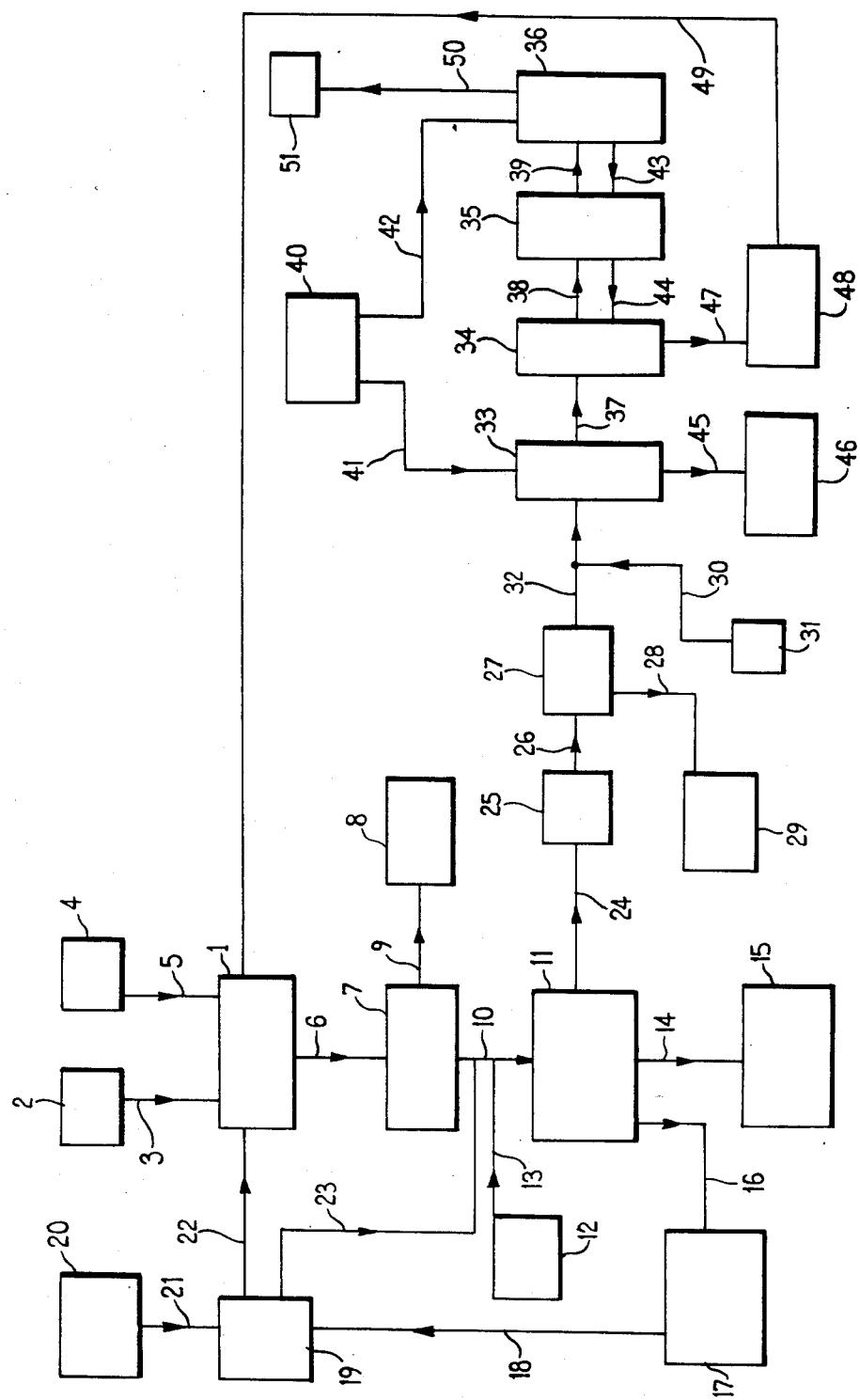

ELECTROLYSIS OF ALKALI METAL CHLORIDE SOLUTION WITH SUBSEQUENT PRODUCTION OF ALKALI METAL CARBONATES AND HYPOCHLORITES

This invention relates to a process for the electrolysis of aqueous alkali metal chloride solution.

Aqueous solutions of alkali metal chlorides are electrolysed on a vast scale throughout the world to produce aqueous alkali metal hydroxide solution and chlorine. Such a solution may be electrolysed in an electrolytic cell containing a flowing mercury cathode and a graphite or metal anode. The solution is electrolysed in such a cell to produce an alkali metal amalgam and chlorine, and the alkali metal amalgam is removed from the cell and reacted with water to produce an aqueous alkali metal hydroxide solution and hydrogen, and the resultant mercury or weak amalgam is returned to the electrolytic cell. Aqueous alkali metal chloride solution may be electrolysed in an electrolytic cell equipped with a separator, which may be of the hydraulically permeable diaphragm type or the substantially hydraulically impermeable membrane type. In the diaphragm type cell the separators positioned between adjacent anodes and cathodes are microporous and in use the electrolyte passes through the diaphragms from the anode compartments to the cathode compartments of the cell. In the membrane type cell the separators are essentially hydraulically impermeable and in use ionic species are transported across the membranes between the anode compartments and the cathode compartments of the cell. Where an aqueous alkali metal chloride solution is electrolysed in an electrolytic cell of the diaphragm type the solution is charged to the anode compartments of the cell, chlorine which is produced in the electrolysis is removed from the anode compartments of the cell, the alkali metal chloride solution passes through the diaphragms to the cathode compartments of the cell, and hydrogen and alkali metal hydroxide produced by electrolysis are removed from the cathode compartments, the alkali metal hydroxide being removed in the form of an aqueous solution of alkali metal chloride and alkali metal hydroxide. Where an aqueous alkali metal chloride solution is electrolysed in an electrolytic cell of the membrane type the solution is charged to the anode compartments of the cell and chlorine produced in the electrolysis and depleted alkali metal chloride solution are removed from the anode compartments, alkali metal ions are transported across the membranes to the cathode compartments of the cell to which water or dilute alkali metal hydroxide solution may be charged, and hydrogen and alkali metal hydroxide solution produced by the reaction of alkali metal ions with water are removed from the cathode compartments of the cell.

Electrolytic cells of the type described may be used particularly in the production of chlorine and sodium hydroxide by the electrolysis of aqueous sodium chloride solution.

The aqueous alkali metal chloride solution used in such electrolysis is generally purified before use, and in particular it is treated in order to reduce the concentration of compounds of polyvalent metals, e.g. salts of divalent or trivalent metals such as calcium, magnesium and iron. Where salts of such polyvalent metals are present in the solution which is electrolysed the salts may have an adverse effect on the electrolysis and it is necessary to reduce the concentration of the salts in the solution. For example, in a diaphragm or membrane electrolytic cell the polyvalent metals may be precipitated as hydroxides during electrolysis and the precipitated hydroxides may lead to partial blockage of the diaphragm or membrane and thus lead to a reduction in the current efficiency of the electrolysis. In order to remove such salts of polyvalent metals from aqueous alkali metal chloride solution the solution is contacted with an aqueous solution containing sodium hydroxide and sodium carbonate in order to precipitate the polyvalent metals as the carbonates or hydroxides, and the precipitated carbonates or hydroxides are removed from the solution, e.g. by sedimentation or by filtration. If desired or if necessary, the solution may be further purified by passing the solution through an ion-exchange resin. Where calcium is present as the sulphate calcium may be removed by contacting the solution with barium carbonate which results in precipitation of calcium carbonate.

It is possible, by use of these purification techniques, to reduce the concentration of polyvalent metal salts in the aqueous alkali metal chloride solution to very low levels, e.g. substantially below 1 ppm expressed as metal. However, as a result of the purification process the solution contains some residual sodium carbonate which can be a source of problems. Thus, where the aqueous alkali metal chloride solution is acidified prior to electrolysis, or where it is acidified or becomes acidified during electrolysis, the acid reacts with the sodium carbonate to produce carbon dioxide which contaminates the gaseous chlorine which is produced in the electrolysis. Carbon dioxide may also be introduced into the chlorine when chlorine is mixed with air which itself contains a proportion of carbon dioxide. Where graphite anodes are used e.g. in a mercury cell, oxidation of the carbon results in production of carbon dioxide.

The presence of carbon dioxide in the gaseous chlorine product can lead to a further problem. Thus, in a plant comprising electrolytic cells for the electrolysis of aqueous alkali metal chloride solution it is necessary to ensure that there is no leakage of gaseous chlorine from the plant, and to this end chlorine gas which may be released at various vents in the plant, or which may be present in the tail gas from the chlorine purification and compression stages, is passed into aqueous alkali metal hydroxide solution with which it reacts to form an aqueous solution of alkali metal hypochlorite. For example, the gas stream containing chlorine may be passed through a plurality of linked reactors through which an aqueous alkali metal hydroxide solution may be passed counter-current to or co-current with the gas stream. This aqueous alkali metal hypochlorite solution may subsequently be reacted with acid in order to recover chlorine which may be combined with the main stream of gaseous chlorine, or the aqueous alkali metal hypochlorite solution may be used as such. However, as the stream of gaseous chlorine contains carbon dioxide the solution which results from reaction of this chlorine with aqueous alkali metal hydroxide solution will also result in production of alkali metal carbonate in solution even though carbon dioxide reacts at a slower rate with alkali metal hydroxide than does chlorine. Thus, in order to ensure that there is substantially complete reaction between the chlorine in the gas stream and the alkali metal hydroxide it is necessary to contact the gas stream with the aqueous alkali metal hydroxide solution for a time which is sufficiently long that reaction takes place between the alkali metal hydroxide and a substantial proportion of the carbon dioxide present in the gas stream. It is the presence of the thus formed alkali metal carbonate in the aqueous alkali metal hypochlorite solution which leads to problems. If the alkali metal hypochlorite solution is acidified the alkali metal carbonate reacts to release carbon dioxide which contaminates the chlorine released by reaction of the acid with the alkali metal hypochlorite. If the alkali metal hypochlorite solution is used as such it is found that the alkali metal carbonate therein may crystallise out, e.g. in stock tanks, pipework and valves, particularly during cold weather, and may result in blockages in plants in which the solution is used. Indeed, the aqueous alkali metal hypochlorite solution may be of a quality which makes it unsuitable for use and thus unsaleable. Also, the formation of alkali metal carbonate in the aqueous alkali metal hypochlorite solution by the reaction of carbon dioxide with alkali metal hydroxide represents a wastage of alkali metal hydroxide.

The present invention relates to a process for the electrolysis of aqueous alkali metal chloride solution which may be operated in such a way as to overcome the aforementioned problems.

According to the present invention there is provided a process for the production of chlorine by the electrolysis of an aqueous alkali metal chloride solution which process comprises the steps of (1) contacting an alkali metal carbonate, and optionally an alkali metal hydroxide, with an aqueous alkali metal chloride solution which contains a polyvalent metal or metals in solution, precipitating therein compounds of polyvalent metals, and removing said precipitated compounds therefrom, (2) electrolysing the solution from step (1) in an electrolytic cell to produce an aqueous alkali metal hydroxide solution and a gaseous stream containing chlorine and carbon dioxide, (3) contacting the gaseous stream from step (2) containing chlorine and carbon dioxide, or a part thereof, with aqueous alkali metal hydroxide solution, in which step (3) of the process is effected in a plurality of reaction vessels, the gaseous stream containing chlorine and carbon dioxide, or a part thereof, being passed into a first reaction vessel or vessels and thence into a second reaction vessel or vessels and aqueous alkali metal hydroxide solution being charged to the first reaction vessel or vessels and aqueous alkali metal hydroxide solution being separately charged to the second reaction vessel or vessels, the process comprising the additional steps of (4) removing an aqueous solution containing alkali metal hypochlorite from the first reaction vessel or vessels, (5) removing an aqueous solution containing alkali metal carbonate from the second reaction vessel or vessels, and optionally (6) passing the solution from step (5) to step (1) and using said solution as, or as part of, the alkali metal carbonate required in step (1) of the process.

It will be appreciated that the aqueous alkali metal chloride solution which is electrolysed in step (2) of the process may be acidified, and that as a result of this acidification, carbon dioxide may be formed by reaction of the acid with residual alkali metal carbonate which is present in the solution from step (1) of the process. This carbon dioxide will be present in the gaseous chlorine stream formed in the electrolysis step (2).

The process of the invention may be operated with an aqueous solution of any alkali metal chloride. However, it is most suitably operated with an aqueous sodium chloride solution, and the invention will be described hereafter with reference to such a solution.

Although in step (1) of the process any alkali metal hydroxide and alkali metal carbonate may be used it is most suitable to use sodium hydroxide and sodium carbonate and the invention will be described hereafter with reference to sodium hydroxide and sodium carbonate. Similarly, step (3) will be described with reference to use of a solution of sodium hydroxide.

In the process of the invention the gaseous stream from the electrolysis step (2) of the process containing chlorine and carbon dioxide, or a part thereof, is reacted successively with an aqueous sodium hydroxide solution in a first reaction vessel or vessels and with an aqueous sodium hydroxide solution separately charged to a second reaction vessel or vessels. The gaseous product of the electrolysis may comprise a major stream containing carbon dioxide and the bulk of the chlorine produced in the electrolysis, and a minor stream containing carbon dioxide and a minor proportion of the chlorine, in particular that chlorine which is released through vents in the plant and that which is present in the tail gas from the chlorine compression stage. It is preferred that the gaseous stream of chlorine and carbon dioxide which is reacted with the sodium hydroxide is this minor stream. However, the gaseous stream which is reacted in step (3) of the process may be a portion of the major gaseous stream, or it may be the whole of the major gaseous stream, particularly in emergencies and during abnormal operation of the plant.

The rates at which chlorine and carbon dioxide react with an aqueous solution of sodium hydroxide are substantially different, and it is an advantage of the process of the present invention that it can be so operated that the bulk of the chlorine and little if any of the carbon dioxide in the gaseous stream may be reacted with the aqueous sodium hydroxide solution in the first reaction vessel or vessels to produce a relatively pure solution of sodium hypochlorite substantially free of sodium carbonate, and that the bulk of the carbon dioxide and little if any of the chlorine in the gaseous stream may be reacted with the aqueous sodium hydroxide solution in the second reaction vessel or vessels to produce an aqueous solution containing sodium carbonate and little if any sodium hypochlorite and which can optionally be used in the purification step (1) of the process. Thus, the process of the invention can be operated to produce a saleable solution of sodium hypochlorite which does not suffer from the problems of contamination with a substantial proportion of sodium carbonate, and to produce a solution of sodium carbonate which is not a waste product but which can play a useful part in the process of the invention.

Control of step (3) of the process may be assisted by suitable choice of temperature, of concentration of sodium hydroxide in the solution in the first reaction vessels and in the second reaction vessels, and of times for which the gaseous stream is in contact with these solutions.

In step (3) of the process the temperature of the aqueous sodium hydroxide solution is not critical. It may suitably be in the range 20° to 40° C. The concentration of the free sodium hydroxide in the aqeuous solution in the first reaction vessel or vessels may suitably be up to 2% by weight, e.g. in the range 0.1 to 1% by weight. The make-up solution charged to the first reaction vessel or vessels may have a sodium hydroxide concentration of up to 25% by weight. The concentration of the free sodium hydroxide in the aqueous solution in the second reaction vessel or vessels may suitably be greater than 10% by weight, e.g. in the range 12 to 24% by weight. The concentration of sodium hydroxide make-up solution charged to the first and second reaction vessels may be substantially the same. The relative proportions of chlorine to carbon dioxide in the gaseous stream may vary over a broad range, for example over the range 1:1 to 50:1 volume:volume.

The times for which the gaseous stream is in contact with the aqueous sodium hydroxide solutions in the first reaction vessel or vessels and in the second reaction vessel or vessels should be suitably adjusted in order to achieve the desirable objective of a solution of sodium hypochlorite in the first reaction vessel or vessels which is substantially free of sodium carbonate and a solution of sodium carbonate in the second reaction vessel or vessels which is substantially free of sodium hypochlorite. The contact times may be of the order of a few seconds, but they are also dependent on the temperature of and the concentrations of the sodium hydroxide solutions, and on the relative proportions of chlorine to carbon dioxide in the gaseous stream. Suitable contact times may be determined by means of simple experiment.

The polyvalent metals which are present in the aqueous sodium chloride solution are precipitated in step (1) of the process by contacting the solution with sodium carbonate and optionally with sodium hydroxide. The polyvalent metals may be, for example, alkaline earth metals, e.g. calcium and magnesium, and the polyvalent metals may be present in the solution as soluble salts thereof, e.g. as chlorides. Contacting of the solution with sodium hydroxide and sodium carbonate is a conventional process, and the sodium hydroxide and sodium carbonate may be used in the form of aqueous solutions or as the solid materials, and they may be used in approximately equal proportions by weight, although the relative proportions may vary over a broad range. The sodium hydroxide and sodium carbonate may be used in an amount which is in excess of that required to precipitate the polyvalent metal compounds.

In step (1) of the process the precipitated polyvalent metal compounds are removed from the sodium chloride solution. These compounds may be removed, for example, by sedimentation or by filtration.

The aqueous sodium chloride solution which results from step (1) of the process typically contains a concentration of polyvalent metal compounds of the order of a few parts per million (ppm) expressed as metal. It may be necessary, for example where the solution is to be electrolysed in an electrolytic cell of the membrane type, for the concentration of the polyvalent metals to be reduced still further to a concentration substantially below 1 ppm. Such a further reduction may be achieved by contacting the solution with an ion-exchange resin.

In step (2) of the process the aqueous sodium chloride solution is electrolysed to produce an aqueous sodium hydroxide solution and a gaseous stream containing chlorine and carbon dioxide. The proportion of carbon dioxide in the gaseous stream will depend on the proportion of residual sodium carbonate present in the solution and on whether or not the solution is acidified prior to electrolysis. The solution will in general be acidified to a pH of below about 7, preferably below about 4, prior to electrolysis, e.g. by addition of HCl to the solution. The gaseous stream produced in the electrolysis may typically contain 0.05% by volume of carbon dioxide.

The electrolysis may be effected in an electrolytic cell of the mercury, diaphragm or membrane type.

The reaction vessels which are used in step (3) of the process may take any convenient form. For example, the reaction vessel may be a packed column down which aqueous sodium hydroxide solution is passed, and the gaseous stream of chlorine and carbon dioxide may be passed upwardly through the column. The reaction vessel may be a venturi scrubber. Step (3) of the process may be effected in reaction vessels of different types. Thus, the first reaction vessel may be of the same type as or different from the second reaction vessel. Where a plurality of first reaction vessels is used they may be of the same type or of different types, and similarly where a plurality of second reaction vessels are used they may be of the same type or of different types.

In the process of the invention an aqueous solution containing sodium hypochlorite is removed from the first reaction vessel or vessels, and an aqueous solution containing sodium carbonate is removed from the second reaction vessel or vessels. It is an optional, but preferred, feature of our process, that the solution removed from the second reaction vessel or vessels be used as the source of at least part of the sodium carbonate for use in step (1) of the process. This solution removed from the second reaction vessel or vessels may also contain sodium hydroxide in addition to sodium carbonate thus providing a solution containing both the components used in step (1) of the process. Use of this solution in this way ensures that the sodium carbonate which is produced, and the sodium hydroxide which is used in its production, is not wasted.

BRIEF DESCRIPTION OF THE DRAWING

The sole FIGURE is a flow diagram of the impoved electrolysis process of the present invention.

DETAILED DESCRIPTION OF THE DRAWING

The process of the invention will now be illustrated with the aid of FIG. 1. FIG. 1 is a flow diagram of a process within the scope of the invention. There are many variants of the process which may be operated depending upon, for example, the quality of sodium chloride, upon whether or not the aqueous sodium chloride solution is to be recycled, and upon the type of electrolytic cell which is used.

In a vessel 1 aqueous sodium chloride solution containing polyvalent metal compounds in solution is contacted with sodium hydroxide charged to vessel 1 from vessel 2 via line 3 and with sodium carbonate charged to vessel 1 from vessel 4 via line 5. The solution from vessel 1, now containing precipitated compounds of polyvalent metals, is passed via line 6 to filtration vessel 7, the solution is filtered therein, and the precipitate is removed to vessel 8 via line 9. The aqueous sodium chloride solution is then charged via line 10 to electrolytic cell 11, the solution being first acidified by mixing it with aqueous hydrochloric acid solution charged from vessel 12 via line 13.

Where the electrolytic cell 11 is a diaphragm or membrane cell the aqueous solution containing sodium hydroxide produced in the electrolysis is passed from the cell via line 14 to vessel 15. Where the electrolytic cell 11 is a mercury cell the sodium amalgam is passed via line 14 to vessel 15 in which the amalgam is reacted with water to produce an aqueous sodium hydroxide solution, the mercury being returned to the cell. Depleted sodium chloride solution is passed from the electrolytic cell 11 via line 16 to vessel 17 in which it is dechlorinated and neutralised. The dechlorinated sodium chloride solution may be discarded as effluent from 17 or it may be passed via line 18 to vessel 19 in which the solution is resaturated with sodium chloride which is charged to vessel 19 from vessel 20 via line 21. A side stream of aqueous sodium chloride solution is passed via line 22 to vessel 1 for purification by precipitation and removal of polyvalent metal compounds and a main stream of sodium chloride solution is charged via line 23 to the electrolytic cell 11. (Alternatively, the whole of the aqueous sodium chloride solution may be passed via line 22 to vessel 1 for purification).

The gaseous stream which is produced in the electrolytic cell 11 and which contains chlorine and carbon dioxide is passed via line 24 to a vessel or vessels 25 in which the gaseous stream is cooled, filtered and dried and via line 26 to a compression and liquefaction unit 27 from which the resultant liquid stream is passed via line 28 to a liquid chlorine storage vessel 29. Gaseous chlorine containing carbon dioxide is passed via line 30 from vents 31 and combined with tail gas from the compressor and passed via line 32 to a first reaction vessel 33 and from this vessel to second reaction vessels 34, 35 and 36 via lines 37, 38 and 39. Aqueous sodium hydroxide solution is separately charged from vessel 40 via line 41 to first reaction vessel 33 and via line 42 to second reaction vessel 36 and thence via lines 43 and 44 to second reaction vessels 35 and 34.

The aqueous sodium hypochlorite solution containing little or no sodium carbonate which is formed in reaction vessel 33 is charged via line 45 to storage vessel 46, and the aqueous sodium carbonate solution which is formed in vessels 34, 35 and 36 is charged via line 47 to vessel 48 and thence via line 49 to vessel 1 for use therein in the treatment of aqueous alkali metal chloride solution. The exhaust gas from vessel 36 is passed via line 50 to a stack 51.

Vessel 40 may comprise separate compartments containing aqueous sodium hydroxide solutions of different concentrations which are separately charged to the reaction vessel 33 and to reaction vessels 34, 35 and 36.

EXAMPLE

In a plant which is shown diagrammatically in FIG. 1 aqueous NaCl containing polyvalent metal compound impurities, mainly compounds of Mg, Ca and Fe, was charged at a rate of 100 M$^3$/hr via line 22 to vessel 1. In vessel 1 the NaCl solution was mixed with 20% by weight aqueous NaOH solution charged to vessel 1 from vessel 2 via line 3 and 10% by weight aqueous Na$_2$CO$_3$ solution charged to vessel 1 from vessel 4 via line 5, both at rates sufficient to precipitate the polyvalent metals in the NaCl solution. The solution from vessel 1 containing precipitated polyvalent metal compounds was passed to filtration vessel 7 via line 6, and the precipitated polyvalent metal compounds, mainly Mg(OH)$_2$, CaCO$_3$ and Fe(OH)$_3$, were removed to vessel 8 via line 9. The treated solution, containing 310 g/l NaCl. 100 mg/l Na$_2$CO$_3$, and traces of polyvalent metal compounds, was removed from vessel 7 via line 10 at a rate of 100 M$^3$/hr, mixed with untreated aqueous NaCl solution charged at a rate of 600 M$^3$/hr from vessel 19 via line 23, and with sufficient 36% by weight aqueous HCl charged from vessel 12 via line 13 to result in a pH of 4 in the NaCl solution. The NaCl solution was charged at a rate of 700 M$^3$/hr to electrolytic cells 11 which were of the mercury type.

Sodium amalgam which was produced in mercury cells 11 was passed via line 14 to denuder 15 in which it was reacted with water to produce hydrogen and 50 weight % aqueous sodium hydroxide solution, and the denuded amalgam was returned to the mercury cells 11.

The depleted NaCl solution, containing 275 g/l NaCl, was passed via line 16 to vessel 17 in which it was dechlorinated, and the dechlorinated solution was passed via line 18 to vessel 19 in which it was resaturated with NaCl passed to vessel 19 from vessel 20 via line 21 at a rate of 24000 Kg/hr. The NaCl solution in vessel 19 was then passed via line 22 to vessel 1 at a rate of 100 M$^3$/hr and via line 23 at a rate of 600 M$^3$/hr.

Gas containing 70% by volume chlorine was removed from electrolytic cells 11 via line 24 at a rate of 6700 M$^3$/hr.

The gas was cooled, filtered and dried in vessel 25 and it was then passed via line 26 to compressor 27 in which it was liquefied, and liquid chlorine (containing 99.99% Cl$_2$) was passed at a rate of 10 M$^3$/hr to storage vessel 29.

Vent gas comprising approximately 0.4% by volume Cl$_2$, 0.03% by volume CO$_2$, and 99.5% by volume air, and tail gas containing 6.8% by volume Cl$_2$, 0.6% by volume CO$_2$, 4% by volume hydrogen and 88.6% by volume air, were passed respectively via lines 30 and 32 from vents 31 and compressor 27 at rates of 4150 M$^3$/hr and 350 M$^3$/hr respectively and combined into a single stream.

The single stream was passed to vessel 33 to which 21% by weight aqueous NaOH solution was also charged via line 41 from vessel 40 at a rate of 0.75 M$^3$/hr, and the exit gas stream from vessel 33 comprising air, hydrogen, and approximately 0.06% by volume CO$_2$ was passed at a rate of 4100 M$^3$/hr to vessels 34, 35 and 36 via lines 37, 38 and 39, 21% by weight aqueous NaOH solution was charged at a rate of 0.33 M$^3$/hr to vessel 36 from vessel 40 via line 42 and thence via lines 43 and 44 to vessels 35 and 34 respectively. The exhaust gas, comprising air, hydrogen and a trace of CO$_2$ was passed via line 50 to the stack 51.

Aqueous sodium hypochlorite solution containing 165 g/l NaOCl, 5 g/l Na$_2$CO$_3$, and 5 g/l NaOH was removed from vessel 33 via line 45 and passed to storage vessel 46, and an aqueous solution containing 220 g/l NaOH, 30 g/l Na$_2$CO$_3$ and less than 0.1 g/l Cl$_2$ (as NaOCl) was passed via line 49 to vessel 1 and used as part of the NaOH and Na$_2$CO$_3$ required to precipitate polyvalent metal compounds in the aqueous NaCl solution.

I claim:
1. A process for the production of chlorine by the electrolysis of an aqueous alkali metal chloride solution which process comprises the steps of
   (1) contacting an alkali metal carbonate with an aqueous alkali metal chloride solution which contains a polyvalent metal or metals in solution, precipitating therein compounds of polyvalent metals, and removing said precipitated compounds therefrom,
   (2) electrolysing the solution from step (1) in an electrolytic cell to produce an aqueous alkali metal hydroxide solution and a gaseous stream containing chlorine and carbon dioxide, (3) contacting the gaseous stream from step (2) containing chlorine and carbon dioxide, or a part thereof, with aqueous alkali metal hydroxide solution, in which step (3) of the process is effected in a plurality of reaction vessels, the gaseous stream containing chlorine and carbon dioxide, or a part thereof, being passed into a first reaction vessel or vessels and thence into a second reaction vessel or vessels and aqueous alkali metal hydroxide solution being charged to the first reaction vessel or vessels and aqueous alkali metal hydroxide solution being separately charged to the second reaction vessel or vessels, the process comprising the additional steps of (4) removing an aqueous solution containing alkali metal hypochlorite from the first reaction vessel or vessels, and (5) removing an aqueous solution containing alkali metal carbonate from the second reaction vessel or vessels.

2. A process as claimed in claim 1 in which in step (1) the aqueous alkali metal chloride solution is also contacted with alkali metal hydroxide.

3. A process as claimed in claim 1 which comprises the additional step (6) in which the aqueous solution containing alkali metal carbonate formed in step (5) is passed to step (1) of the process and used therein as, or as part of, the alkali metal carbonate required in step (1).

4. A process as claimed in claim 1 in which the aqueous alkali metal chloride solution electrolysed in step (2) of the process is acidified.

5. A process as claimed in claim 4 in which the aqueous alkali metal chloride solution is acidified to a pH of less than 4.

6. A process as claimed in claim 1 in which the gaseous stream containing chlorine and carbon dioxide is that stream released through vents and/or the tail gas from the chlorine compression stage.

7. A process as claimed in claim 1 in which the aqueous alkali metal hydroxide solution in step (3) of the process is at a temperature in the range 20° to 40° C.

8. A process as claimed in claim 1 in which in the aqueous solution in the first reaction vessel or vessels the free alkali metal hydroxide concentration is up to 2% by weight.

9. A process as claimed in claim 1 in which in the aqueous solution in the second reaction vessel or vessels the free alkali metal hydroxide concentration is greater than 10% by weight.

10. A process as claimed in claim 1 in which the proportion of chlorine to carbon dioxide contacted with aqueous alkali metal hydroxide solution in step (3) of the process is in the range 1:1 to 50:1 volume:volume.

* * * * *